United States Patent

Taube et al.

[11] Patent Number: 5,958,820
[45] Date of Patent: Sep. 28, 1999

[54] GAS-PHASE POLYMERISATION OF CONJUGATED DIENES IN THE PRESENCE OF RARE EARTH ALLYL COMPOUNDS

[75] Inventors: Rudolf Taube, Freising; Steffen Maiwald, Merseburg; Thomas Rühmer, Grossörner; Heike Windisch, Bergisch Gladbach; Jürgen Giesemann, Halle; Gerd Sylvester, Leverkusen, all of Germany

[73] Assignee: Bayer AG, Germany

[21] Appl. No.: 08/930,725

[22] PCT Filed: Mar. 22, 1996

[86] PCT No.: PCT/EP96/01276

§ 371 Date: Oct. 2, 1997

§ 102(e) Date: Oct. 2, 1997

[87] PCT Pub. No.: WO96/31544

PCT Pub. Date: Oct. 10, 1996

[30] Foreign Application Priority Data

Apr. 4, 1995 [DE] Germany .......................... 195 12 116

[51] Int. Cl.[6] .............................. B01J 31/00; B01J 37/00; C08F 4/02; C08F 4/60
[52] U.S. Cl. .......................... 502/102; 502/104; 502/107; 502/108; 502/118; 502/126; 526/164; 526/335; 526/340.2
[58] Field of Search ................................ 526/335, 340.2, 526/164; 502/102, 104, 118

[56] References Cited

U.S. PATENT DOCUMENTS

| | | | |
|---|---|---|---|
| 3,297,667 | 1/1967 | Von Dohlen et al. | 520/340.2 |
| 3,301,839 | 1/1967 | Natta et al. | 526/340.2 |
| 3,709,851 | 1/1973 | Mori et al. | 526/340.2 |
| 3,937,692 | 2/1976 | Lugli et al. | 526/164 |
| 4,556,647 | 12/1985 | Yeh et al. | 526/164 |
| 4,575,538 | 3/1986 | Hsieh et al. | 502/102 |
| 4,619,982 | 10/1986 | Jenkins | 526/164 |
| 4,736,001 | 4/1988 | Carbonaro et al. | 526/63 |
| 5,021,379 | 6/1991 | Martin et al. | 502/102 |
| 5,066,739 | 11/1991 | Pettijohn et al. | 502/102 |
| 5,104,950 | 4/1992 | Martin et al. | 502/102 |
| 5,109,085 | 4/1992 | Pettijohn et al. | 502/102 |
| 5,224,991 | 7/1993 | Geerts | 502/102 |
| 5,502,126 | 3/1996 | Bell et al. | 502/102 |
| 5,652,304 | 7/1997 | Calderon et al. | 526/340.2 |
| 5,686,371 | 11/1997 | Ansell et al. | 502/102 |
| 5,877,109 | 3/1999 | Reichert et al. | 526/164 |

FOREIGN PATENT DOCUMENTS

| | | | |
|---|---|---|---|
| 745747 | 8/1970 | Belgium | 526/340.2 |
| 11 184 | 5/1980 | European Pat. Off. | |
| 647 657 | 4/1995 | European Pat. Off. | |
| 1 145 359 | 3/1963 | Germany | 526/340.2 |
| 2 045 563 | 3/1972 | Germany | 526/340.2 |
| 4 334 045 | 4/1995 | Germany | |
| 49-41348 | 11/1974 | Japan | 526/340.2 |
| 57-123204 | 7/1982 | Japan | 526/340.2 |
| 60-53509 | 3/1985 | Japan | 526/340.2 |
| 809672 | 10/1962 | United Kingdom | 526/340.2 |
| 938071 | 9/1963 | United Kingdom | 526/340.2 |
| 946016 | 1/1964 | United Kingdom | 526/340.2 |
| 992189 | 5/1965 | United Kingdom | 526/340.2 |

OTHER PUBLICATIONS

Aldrich Chemical Company catalog, pp. 224, 511, 775, 1011, 1990.

Rudolf Taube, Heike Windisch and Steffen Maiwald, *The Catalysts of the Steroeospecific Butadiene Polymerization by Allyl Nickel and Allyl Lanthanide Complexes—A Mechanistic Comparison*, in Macromol. Symp., 89, pp. 393–409 (1995).

*Primary Examiner*—Mark L. Bell
*Assistant Examiner*—J. Pasterczyk
*Attorney, Agent, or Firm*—Connolly Bove Lodge & Hutz LLP

[57] ABSTRACT

A process for polymerizing a gaseous conjugated diene by bringing it in contact with a catalyst consisting of a rare earth allyl compound, an organic aluminum compound, an inorganic support and optionally, the same or a different conjugated diene. The resulting polymers possess elevated proportions of cis-1,4 units.

21 Claims, No Drawings

GAS-PHASE POLYMERISATION OF CONJUGATED DIENES IN THE PRESENCE OF RARE EARTH ALLYL COMPOUNDS

BACKGROUND OF THE INVENTION

1. Field of the Invention

This invention relates to a novel catalyst, to the production thereof and to the use thereof for the polymerisation of conjugated dienes, in particular butadiene, in the gas phase.

2. Description of the Prior Art

Polybutadiene with an elevated proportion of cis-1,4 units has long been produced on a large industrial scale and used for the production of tires and other rubber articles. Polymerisation is performed in this connection in the liquid phase using the most various catalyst systems. A particularly advantageous catalyst system for the production of polybutadiene with an elevated proportion of cis-1,4 units is described in European Patent 11 184. The catalyst system which is described therein and used for solution polymerisation of butadiene consists of a rare earth carboxylate, an aluminiumtrialkyl and/or alkylaluminium hydride and a further Lewis acid.

Polymerising conjugated dienes in solution has the disadvantage that when the unreacted monomer and the solvent are separated from the formed polymer, low molecular weight compounds may escape to the environment in exhaust air and effluent and must thus be appropriately disposed of.

It is also known (EP 201 979) to polymerise conjugated dienes without adding solvents in the liquid monomers. However, such a process has the disadvantage that a large quantity of heat is liberated on complete polymerisation, which is difficult to control and thus constitutes a certain potential hazard. Moreover, here too, there is an environmental impact when the polymers are separated from the monomers.

In recent years, the gas phase process has proved particularly advantageous, particularly for the production of polyethylene and polypropylene and has become widely used industrially. The environmental advantages of the gas phase process are in particular that no solvents are used and emissions and effluent contamination may be reduced.

There has hitherto been no known process for the direct gas phase polymerisation of conjugated dienes, in particular of butadiene. One reason for this may be that the Ziegler-Natta catalysts based on titanium, cobalt, nickel or neodymium which are used for the solution polymerisation of conjugated dienes are not straightforwardly suitable for gas phase polymerisation, in particular due to their low productivity, i.e. the small quantity of polymer which may be produced with a certain quantity of catalyst. Thus, due to its rapidly falling activity when used in gas phase polymerisation, the catalyst described in EP 11 184 is virtually completely unsuitable to polymerise conjugated dienes, in particular butadiene, in the gas phase to yield polymers with an elevated proportion of cis-1,4 units (see comparative test).

German Application P 43 34 045.8 contains the first description of a catalyst system which allows the polymerisation of conjugated dienes, in particular butadiene. The catalysts described in the stated application consist of rare earth compounds and an inorganic support.

The object of the present invention was thus to provide novel catalysts for the polymerisation of conjugated dienes, in particular butadiene, from the gas phase, which catalysts may advantageously be used in the gas phase process.

It has now surprisingly been found that it is possible to polymerise conjugated dienes, in particular butadiene to yield polybutadiene, with an elevated cis-1,4 double bond content, from the gas phase with rare earth catalysts if certain rare earth allyl compounds in combination with an aluminiumalkyl and an inorganic support are used.

The present invention thus provides a catalyst consisting of:

A) a rare earth allyl compound of the formula (I)

$$(C_3R_5)_n MX_{3-n'} \qquad (I),$$

in which
M means a trivalent rare earth element with an atomic number of 57 to 71,
X denotes Cl, Br, I, $NR_2$, OR, $RCO_2$, $C_5H_mR_{5-m}$, $C_5H_m(SiR_3)_{5-m}$, $C_1$ to $C_6$ alkyl, $(C_6H_5)_3C$, RS, $N(Si(CH_3)_3)_2$ with R having the following meaning,
R is identical or different and means hydrogen or an alkyl, aralkyl or aryl group with 1 to 10 carbon atoms,
n' is 1 to 3, and m is 1 to 5, B) an organoaluminium compound selected from the group comprising aluminiumtrialkyls (II), dialkylaluminium hydrides (III), dialkylaluminium halides (IV) or alkylaluminium dihalides (V) and/or an alumoxane of the formulae (VI) to (VII):

$$AlR'_3 \text{ (II)}, HAlR'_2 \text{ (III)}, R'_2AlX \text{ (IV)}, R'AlX_2 \text{ (V)}, R'_2Al[OAl(R')]_n OAlR'_2 \text{ (VI)}, [OAlR']_{n-2} \qquad (VII),$$

wherein, in the formulae,
R' is identical or different and means an alkyl group with 1 to 12 carbon atoms,
X is Cl, Br, I, or OR', and
n means 1 to 50, except where the alumoxane of the formula (VII) is cyclic, in which case n is at least about 6, C) an inert, particulate, inorganic solid with a specific surface area of greater than 10 $m^2/g$ (BET method) and a pore volume of 0.3 to 15 ml/g, and optionally D) a conjugated diene.

DESCRIPTION OF THE PREFERRED EMBODIMENTS

π-Allyl complexes of a trivalent rare earth element with the atomic numbers identified in the periodic system of 57 to 71 are used as component A. Preferred compounds are those in which M means lanthanum, cerium, praseodymium or neodymium or a mixture of rare earth elements which contains at least 10 wt. % of at least one of the elements lanthanum, cerium, praseodymium or neodymium. Very particularly preferred compounds are those in which M means lanthanum praseodymium or neodymium or a mixture of rare earths which contains at least 30 wt. % of lanthanum, praseodymium or neodymium.

Addition compounds of the formula (I) with other compounds, for example ethers, amines or Li-alkyls may also be used as component A.

The rare earth compounds may be used individually or mixed together.

The following may be mentioned as examples of component A:

$La(C_3H_5)_3 \cdot 1.5$ dioxane $La(C_3H_5)_3.1$ dimethyl glycol ether
$La(C_3H_5)_3.1$ tetramethylethylenediamine
$La(C_3H_5)_3.2$ hexamethylphosphoric acid triamide
$C_5H_5La(C_3H_5)_2.0.2$ dioxane
$C_5Me_5La(C_3H_5)_2$ $La(C_3H_5)\{N(SiMe_3)_2\}_2.1.2$ THF
$La(C_3H_5)\{Me_3SiN)_2CPh\}_2.0.6$ THF
$La(C_3H_5)\{2,2'\text{-}S(6\text{-}^tBu\text{-}4\text{-}Me\text{-}C_6H_3O)_2$ 2 THF
$La(C_3H_5)_2Cl.2$ THF $Li[La(C_3H_5)_4].1.5$ dioxane
$Li[La(C_3H_4CH_3)_4].2$ dioxane
$Li[La(C_3H_4CH_2C(CH_3)_3)_4].2$ dioxane $Li[C_pLa(C_3H_5)_3].2$ dioxane
$Li[C_5Me_5La(C_3H_5)_3].2$ dioxane
$Li[indenylLa(C_3H_5)_3].2$ dioxane
$Li[fluorenylLa(C_3H_5)_3].2$ dioxane
$Li[C_5Me_5La(all)_3].2$ THF $Nd(C_3H_5)_3.$dioxane $C_5H_5Nd(C_3H_5)_2.$dioxane
$C_5Me_5Nd(C_3H_5)_2$ $Nd(C_3H_5)_2Cl.$THF
$Nd(C_3H_5)Cl_2.1.5$ THF $[(2,4\text{-}(CH_3)_2C_5H_5)NdCl_2].0.33$ THF
$Li[Nd(C_3H_5)_4].1.5$ dioxane $Li[CpNd(C_3H_5)_3].2$ dioxane
$Li[C_5Me_5Nd(C_3H_5)_3].3$ DME The following are preferred:

$Nd(C_3H_5)_3.$dioxane
$C_5H_5Nd(C_3H_5)_2.$dioxane
$C_5Me_5Nd(C_3H_5)_2$ $Nd(C_3H_5)_2Cl.$THF
$Nd(C_3H_5)Cl_2.1.5$ THF
$Li[Nd(C_3H_5)_4].1.5$ dioxane.

Aluminiumalkyls of the formula (II) may in particular be considered as component B, such as trimethylaluminium, triethylaluminium, tri-n-propylaluminium, triilsopropylaluminium, tri-n-butylaluminium, triisobutylaluminium, tripentylaluminium, trihexylaluminium, tricyclohexylaluminium and/or trioctylaluminium.

Examples of suitable aluminiumalkyls of the formula (III) are: diethylaluminium hydride, di-n-butylaluminium hydride and/or diisobutylaluminium hydride.

Examples of suitable aluminiumalkyls of the formula (IV) are: dimethylaluminium bromide, dimethylaluminium chloride, diethylaluminium bromide, diethylaluminium chloride, dibutylaluminium bromide and/or dibutylaluminium chloride.

Examples of suitable aluminiumalkyls of the formula (V) are: methylaluminium dibromide, methylaluminium dichloride, ethylaluminium dibromide, ethylaluminium dichloride, butylaluminium dibromide and/or butylaluminium dichloride.

Examples of alumoxanes of the formulae (VI) and (VII) which may be mentioned are: methylalumoxane, ethylalumoxane and/or isobutylalumoxane, preferably methylalumoxane and isobutylalumoxane.

Inert, particulate, inorganic solids with a specific surface area of greater than 10, preferably of 10 to 1000 $m_2/g$ (BET method) and a pore volume of 0.3 to 15, preferably of 0.5 to 12 ml/g are used as component C.

Specific surface area (BET method) is determined in the conventional manner according to S. Brunauer, P. H. Emmett & Teller, J. Amer. Chem. Soc. 60 (2), 309 (1938), pore volume is determined by the centrifugation method according to M. McDaniel, J. Colloid Interface Sci. 78, 31 (1980).

Suitable inert inorganic solids are, in particular, silica, silica gels, clays, aluminosilicates, talcum, zeolites, carbon black, graphite, inorganic oxides, such as silicon dioxide, aluminium oxide, magnesium oxide, titanium dioxide, silicon carbide, preferably silica gels, aluminium oxide, zeolites and carbon black, particularly preferably silica, silica gel and aluminium oxide. Inert is taken to mean in this case that the solids neither have a reactive surface nor contain adsorbed material which prevent the formation of an active catalyst or react with the monomers.

The stated inert, inorganic solids which fulfil the above-stated specification and are consequently suitable for the application are described in greater detail, for example, in Ullmanns Enzyclopädie der technischen Chemie volume 21, pages 439 et seq. (silica gels), volume 23, pages 311 et seq. (clays), volume 14, pages 633 et seq. (carbon blacks), volume 24, pages 575 et seq. and volume 17, pages 9 et seq. (zeolites).

The inorganic solids may be used individually or mixed together.

The ratio in which the catalyst components A to C are used may be varied within broad limits.

The molar ratio of component A to component B is 1:0.1 to 1:25000, preferably 1:0.3 to 1:2000, particularly preferably 1:0.5 to 1:100. 0.01 to 10 g of component A, preferably 0.5 to 5 g of component A are used per 100 g of component C.

It is also possible to add still another component D to the catalyst components A to C. This component D is a conjugated diene which may be the same diene as is subsequently to be polymerised with the catalyst. Butadiene and isoprene are preferably used.

Component D is added to the catalyst in a quantity of 0.1 to 1000 mol relative to 1 mol of component A, particularly preferably 0.1 to 100 mol relative to 1 mol of component A. 0.1 to 50 mol of D relative to 1 mol of component A are very particularly preferably used.

The present invention also provides the production of the catalyst system described above. This is produced by mixing components A to D in an inert solvent and/or diluent and, after the desired time, separating the solvent or diluent by distillation, optionally under a vacuum. Inert solvents and/or diluents which may be used are aliphatic, cycloaliphatic and/or aromatic solvents, such as pentane, hexane, heptane, cyclohexane, benzene and/or toluene. The sequence in which components A to D and the inert solvent are added to the reaction batch may be selected at will, if it has any influence at all upon the properties of the resultant catalyst.

A slurry of component C may, for example, be prepared in the inert solvent, component B may then be added, followed by A and finally D. It is also possible to distil off the inert solvent or diluent between the individual components before further components, optionally in a solvent, are added. After the addition of individual components, the catalyst may also be treated once or repeatedly with a solvent in order not to remove substances attached to the support.

The individual components may also be divided and the portions added at different times to the catalyst batch. A preferred embodiment, for example, consists in treating component C with component B in an inert solvent or diluent and then adding component A and optionally D.

The quantity of the inert solvent and/or diluent used may be varied within wide limits. On economic grounds, the quantity is kept as small as possible. The minimum quantity is determined on the basis of the quantity and solubility of the individual components and the pore volume of component C. A quantity of 10 to 2000 parts of the solvent and/or diluent, relative to 100 parts of component C, is preferably used.

The catalyst may be produced over a broad temperature range. In general, the temperature is between the melting and boiling point of components A to B or of the inert solvent and/or diluent. The reaction is conventionally performed at temperatures of −20 to 80° C.

The invention also relates to a process for the polymerisation of gaseous conjugated dienes, for example of 1,3-butadiene, isoprene, pentadiene or dimethylbutadiene.

Polymerisation proceeds by bringing the gaseous conjugated diene into contact with the described catalyst. Further gases may be added to the gaseous monomers for purposes of dilution, dissipation of heat or control of molecular weight. Polymerisation may be performed at pressures of 1 mbar to 50 bar, preferably of 1 to 20 bar.

Polymerisation is generally performed at temperatures of −20 to 250° C., preferably at 0 to 200° C., particularly preferably at 20 to 160° C.

Polymerisation may be executed in any apparatus suitable for gas phase polymerisation. A tubular reactor, rotary reactor or a fluidised bed reactor or a combination of these reactor types may thus, for example, be used. In order to avoid agglutination, it may be helpful to add known dusting agents. Dusting agents which may be used are any inert, finely divided solids, in particular also the inert, inorganic solids described as component C.

The polymers obtained have a cis-1,4 double bond content of approximately 60 to 99%. Molecular weight may be modified by the composition of the catalyst and by varying the polymerisation conditions.

Mooney viscosity, ML (1+4', 100° C.), (measured to DIN 53 523) is conventionally in the range between 30 and 180 MU. Very high molecular weight polymers may also be produced by gas phase polymerisation which are obtainable only at extremely high cost by solution polymerisation due to their elevated viscosity and the possibility of transfer reactions due to the solvent used.

The resultant polymers may be compounded and vulcanised in the conventional manner.

In a common embodiment, 1,3-butadiene is polymerised as follows:

The catalyst consisting of components A to C and optionally D is transferred into an apparatus which is suitable to maintain the pulverulent catalyst in motion. This may proceed, for example, by stirring, rotating and/or a gas stream. The inert gas initially located in the gas space, for example nitrogen, is replaced by the gaseous monomer. Polymerisation then begins immediately and the temperature rises. The monomer, optionally diluted with an inert gas, is introduced into the reactor at a rate such that the desired reaction temperature is not exceeded. The reaction temperature may be adjusted in a customary manner by heating or cooling. Polymerisation is terminated by shutting off the monomer supply. The polymer may be further treated in the known manner by deactivating the catalyst and treating the polymer with known antioxidants.

The following example is intended to clarify the present described invention, but without restricting it thereto.

EXAMPLE

Example 1 a) Pretreatment of Support

The support used was a silica gel from Grace Davison with a surface area of 600 m²/g (BET method). Average particle size was 45 μm. The silica gel had been dried for 2 hours at 600° C. under a stream of argon prior to use.

b) Catalyst Production

A slurry of 10 g of the support described in a) was prepared in 50 ml of toluene and stirred with 80 g of a 10% solution of methylalumoxane (from Witco GmbH) in toluene for 2 hours at −30° C. and 48 hours at room temperature. 1.5 g of tris-π-allylneodymium, $(C_3H_5)_3Nd * 1.5$ dioxane were then added at −30° C. and stirred for a further 48 hours at room temperature. Once the toluene had been distilled off under a vacuum at room temperature, a free flowing powder was isolated.

c) Polymerisation

Polymerisation was performed in a rotary evaporator which was equipped with a magnetic stirring rod, a mercury pressure relief valve and connections to a vacuum pump and to supply gaseous nitrogen and butadiene together with a thermocouple reaching nearly to the bottom of the 1 liter flask. The gradient of the rotary evaporator was adjusted such that the axis of rotation formed an angle of 45° relative to that of the bar magnet. The total volume of the apparatus was 1.5 liters. 3.0 g of the catalyst described above were introduced into the flask under nitrogen. The apparatus was evacuated to 1 mbar and, while being stirred and rotated, was filled with gaseous, dry butadiene to a pressure of 500 mbar. The temperature rose to 80° C. within 1 minute. The pressure fell simultaneously. Once the pressure reached 450 mbar, the reactor was repressurised with butadiene to a pressure of 500 mbar. Butadiene was added over the remainder of the test in such a manner that the temperature was maintained between 30 and 90° C.

After 4.5 hours, the apparatus was evacuated and then filled with $N_2$. 216 g of butadiene had been consumed at this time.

The resultant product was removed from the flask and was treated for 4 hours with 2 g of Vulkanox BKF (Bayer AG), dissolved in 1 liter of acetone, in order to shortstop and stabilise it. The acetone was then distilled off under a vacuum. The weight of the dry polybutadiene was 215 g.

The Mooney viscosity of the polymer: ML (1+4'; 100° C.) was 147 MU. cis-1,4 double bond content: 96.5%.

What is claimed is:

1. A catalyst consisting of:

A) A rare earth allyl compound having the formula (I):

$$(C_3R_5)_{n'}MX_{3-n'} \qquad (I),$$

in which
M means a trivalent rare earth element having an atomic number of 57 to 71,
X means Cl, Br, I, $NR_2$, OR, $RCO_2$, $C_5H_mR_{5-m}$, $C_5H_m(SiR_3)_{5-m}$, $C_1$ to $C_6$ alkyl, trityl, $C_{12}H_{12}$, RS, or $N(Si(CH_3)_3)_2$
R is identical or different and means hydrogen or an alkyl, aralkyl or aryl group having 1 to 10 carbon atoms,
n' is 1 to 3, and
m is 1 to 5;

B) (V) an organoaluminium compound comprising aluminium trialkyls (II), dialkylaluminium hydrides (III), dialkylaluminium halides (IV), alkylaluminium dihalides (V), an alumoxane of the formulae (VI) to (VII): AlR'$_3$ (II), HAlR'$_2$ (III), R'$_2$AlX (IV), R'AlX$_2$ (V), R'$_2$Al[OAl(R')]$_n$OAlR'$_2$ (VI), [OAlR']$_{n-2}$ (VII), or a mixture thereof, in which R' is identical or different and means an alkyl group having 1 to 12 carbon atoms, X means Cl, Br, I, or OR', and n is 1 to 50, except where the alumoxane of the formula (VII) is cyclic, in which case n is at least about 6;

C) an inert, particulate, inorganic solid having a specific surface area of greater than 10 m$^2$/g as measured by BET method and a pore volume of 0.3 to 15 ml/g; and D) optionally, a conjugated diene.

2. A catalyst according to claim 1, wherein component A and component B are present in a molar ratio of about 1:0.1 to 1:25000.

3. A catalyst according to claim 1, wherein component D is present in quantities of 0 to 1000 mol relative to 1 mol of component A.

4. A catalyst according to claim 1, wherein component A is present in quantities of 0.1 to 10 g relative to 100 g of component C.

5. A process for producing the catalyst according to claim 1, wherein component D) is present, the process comprising the steps of mixing components A) to D) in an inert, organic solvent, a diluent, or a mixture, thereof, at temperatures of about –20 to 80° C., and separating all the solvent, the diluent, or the mixture thereof.

6. A catalyst consisting of:

A) A rare earth allyl compound having the formula (I):

$(C_3R_5)_{n'}MX_{3-n'}$     (I), in which

M means a trivalent rare earth element having an atomic number of 57 to 71,

X means Cl, Br, I, NR$_2$, OR, RCO$_2$, C$_5$H$_m$R$_{5-m}$, C$_5$H$_m$(SiR$_3$)$_{5-m}$, C$_1$ to C$_6$ alkyl, trityl, C$_{12}$H$_{12}$, RS, or N(Si(CH$_3$)$_3$)$_2$, R is identical or different and means hydrogen or an alkyl, aralkyl or aryl group having 1 to 10 carbon atoms, n' is 1 to 3, and m is 1 to 5;

B) an organoaluminium compound comprising aluminium trialkyls (II), dialkylaluminium hydrides (III), dialkylaluminium halides (IV), alkylaluminium dihalides (V), an alumoxane of the formulae (VI) to (VII): AlR'$_3$ (II), HAlR'$_2$ (III), R'$_2$AlX (IV), R'AlX$_2$ (V), R'$_2$Al[OAl(R')]$_n$OAlR'$_2$ (VI), [OAlR']$_{n-2}$ (VII), or a mixture thereof, in which R' is identical or different and means an alkyl group having 1 to 12 carbon atoms, X means Cl, Br, I, or OR', and n is an integer up to 50;

C) an inert, particulate, inorganic solid having a specific surface area of greater than 10 m$^2$/g as measured by BET method and a pore volume of 0.3 to 15 ml/g; and D) optionally, a conjugated diene.

7. The process according to claim 5, wherein the inert, organic solvent or the diluent is aliphatic, cycloaliphatic, aromatic, or a mixture thereof.

8. The process according to claim 7, wherein the inert, organic solvent or the diluent comprises pentane, hexane, heptane, cyclohexane, benzene, toluene, or a mixture thereof.

9. A process for producing the catalyst according to claim 1, wherein component D is not present, the process comprising the steps of mixing components A) to C) in an inert, organic solvent, a diluent, or a mixture thereof, at temperatures of about –20 to 80° C., and separating of the solvent, the diluent, or the mixture thereof.

10. The catalyst according to claim 1, wherein M represents lanthanum, cerium, praseodymium, neodymium, a mixture thereof, or a mixture of rare earth elements including at least 10% by weight of at least one of lanthanum, cerium, praseodymium or neodymium.

11. The catalyst according to claim 1, wherein the aluminiumtrialkyls (II) of component B) comprise trimethylaluminium, triethylaluminium, tri-n-propylaluminium, triisopropyl-aluminium, tri-n-butylaluminium, triisobutylaluminium, tripentylaluminium, trihexylaluminium, tricyclohexylaluminium, trioctylaluminium, or a mixture thereof.

12. The catalyst according to claim 1, wherein the dialkylaluminium hydrides (III) of component B) comprise diethylaluminium hydride, di-n-butylaluminium hydride, diisobutylaluminium hydride, or a mixture thereof.

13. The catalyst according to claim 1, wherein the dialkylaluminium halides (IV) of component B) comprise dimethylaluminium bromide, dimethylaluminium chloride, diethylaluminium bromide, diethylaluminium chloride, dibutylaluminium bromide, dibutylaluminium chloride, or a mixture thereof.

14. The catalyst according to claim 1, wherein the alkylaluminium dihalides (V) of component B) comprise methylaluminium dibromide, methylaluminium dichloride, ethylaluminium dibromide, butylaluminium dichloride, or a mixture thereof.

15. The catalyst according to claim 1, wherein the alumoxane (VI and VII) of component B) comprises methylalumoxane, ethylalumoxane, isobutylalumoxane, or a mixture thereof.

16. The catalyst according to claim 1, wherein the inert, particulate, inorganic solid comprises silica, silica gels, clays, aluminosilicates, talcum, zeolites, carbon black, graphite, inorganic oxides, silicon carbide, or a mixture thereof.

17. A process for polymerizing a gaseous conjugated diene, the process comprising bringing the gaseous conjugated diene into contact with the catalyst according to claim 1.

18. The process according to claim 17, wherein the conjugated diene comprises 1,3-butadiene.

19. A catalyst consisting of a reaction product of components A), B), C), and optionally D) according to claim 1.

20. A catalyst consisting of:

A) an addition compound of a rare earth allyl compound having the formula (I):

$(C_3R_5)_{n'}MX_{3-n'}$     (I), and an ether, an amine, an amide, or a Li-alkyl, in which M means a trivalent rare earth element having an atomic number of 57 to 71, X means Cl, Br, I, NR$_2$, OR, RCO$_2$, C$_5$H$_m$R$_{5-m}$, C$_5$H$_m$(SiR$_3$)$_{5-m}$, C$_1$ to C$_6$ alkyl, trityl, C$_{12}$H$_{12}$, RS, or N(Si(CH$_3$)$_3$)$_2$ R is identical or different and means hydrogen or an alkyl, aralkyl or aryl group having 1 to 10 carbon atoms, n' is 1 to 3, and m is 1 to 5;

B) an organoaluminium compound comprising aluminiumtrialkyls (II), dialkylaluminium hydrides (III), dialkylaluminium halides (IV), alkylaluminium dihalides (V), an alumoxane of the formulae (VI) to (VII): $AlR'_3$ (II), $HAlR'_2$ (III), $R'_2AlX$ (IV), $R'AlX_2$ (V), $R'_2Al[OAl(R')]_n OAlR'_2$ (VI), $[OAlR']_{n-2}$ (VII), or a mixture thereof, in which
R' is identical or different and means an alkyl group having 1 to 12 carbon atoms,
X means Cl, Br, I, or OR', and
n is 1 to 50, except where the alumoxane of the formula (VII) is cyclic, in which case n is at least about 6;

C) an inert, particulate, inorganic solid having a specific surface area of greater than 10 $m^2/g$ as measured by BET method and a pore volume of 0.3 to 15 ml/g; and D) optionally, a conjugated diene.

21. The catalyst according to claim 20, wherein the ether comprises 1,4-dioxane, dimethyl glycol ether, or tetrahydrofuran.

* * * * *

UNITED STATES PATENT AND TRADEMARK OFFICE
CERTIFICATE OF CORRECTION

PATENT NO. : 5,958,820
DATED : September 28, 1999
INVENTOR(S) : Rudolf Taube, et al.

It is certified that error appears in the above-identified patent and that said Letters Patent is hereby corrected as shown below:

Claim 5, line 5 (column 7, line 28), change "all" to -- off --.

Claim 6, line 2 (column 7, line 31), change the second occurrence of "A" to -- a --.

Claim 9, line 5 (column 8, line 5), change the second occurrence of the word "of" to -- off --.

Signed and Sealed this

Twentieth Day of June, 2000

Q. TODD DICKINSON

*Attest:*

*Attesting Officer*    *Director of Patents and Trademarks*